US012676405B2

(12) United States Patent
Janardhanan

(10) Patent No.: US 12,676,405 B2
(45) Date of Patent: Jul. 7, 2026

(54) ANTENNA RADOME FOR REDUCED WIND LOADING

(71) Applicant: John Mezzalingua Associates, LLC, Liverpool, NY (US)

(72) Inventor: Karthik Janardhanan, Syracuse, NY (US)

(73) Assignee: John Mezzalingua Associates, LLC, Liverpool, NY (US)

( * ) Notice: Subject to any disclaimer, the term of this patent is extended or adjusted under 35 U.S.C. 154(b) by 0 days.

(21) Appl. No.: 18/563,138

(22) PCT Filed: May 27, 2022

(86) PCT No.: PCT/US2022/031259
§ 371 (c)(1),
(2) Date: Nov. 21, 2023

(87) PCT Pub. No.: WO2022/251578
PCT Pub. Date: Dec. 1, 2022

(65) Prior Publication Data

US 2024/0380104 A1 Nov. 14, 2024

Related U.S. Application Data

(60) Provisional application No. 63/193,815, filed on May 27, 2021.

(51) Int. Cl.
*H01Q 1/42* (2006.01)
*H01Q 1/00* (2006.01)

(52) U.S. Cl.
CPC .............. *H01Q 1/42* (2013.01); *H01Q 1/005* (2013.01)

(58) Field of Classification Search
CPC ........... H01Q 1/005; H01Q 1/42; H01Q 1/246
See application file for complete search history.

(56) References Cited

U.S. PATENT DOCUMENTS

| | | | |
|---|---|---|---|
| 7,460,080 | B1 | 12/2008 | Watson, III |
| 2011/0063183 | A1 | 3/2011 | Sanford |
| 2018/0287251 | A1 | 10/2018 | Proshold et al. |

(Continued)

FOREIGN PATENT DOCUMENTS

| | | | |
|---|---|---|---|
| CN | 201383537 | Y | 1/2010 |
| CN | 208272135 | U | 12/2018 |

(Continued)

OTHER PUBLICATIONS

Ferris "Wind loading on base station antennas" (Year: 2009).*

(Continued)

*Primary Examiner* — Dimary S Lopez Cruz
*Assistant Examiner* — Anna N Hamadyk
(74) *Attorney, Agent, or Firm* — Meunier Carlin & Curfman LLC

(57) ABSTRACT

Disclosed is a radome for a cellular antenna that significantly improves windloading, which may be crucial for successful deployments on cell towers where the antenna may be deployed at considerable height and in environments where extreme weather is possible. The windloading performance is provided by the profile shape of the radome. The profile shape may be accommodated through the use of low band dipoles that are shorter in length.

2 Claims, 2 Drawing Sheets

(56) References Cited

U.S. PATENT DOCUMENTS

| | | | | |
|---|---|---|---|---|
| 2020/0076068 | A1 | 3/2020 | Sutar | |
| 2022/0123459 | A1* | 4/2022 | Touchet | H01Q 1/005 |
| 2022/0173492 | A1* | 6/2022 | Weber | H01Q 1/005 |

FOREIGN PATENT DOCUMENTS

| | | | |
|---|---|---|---|
| KR | 10-2008-0017864 | A | 2/2008 |
| WO | 2020169679 | A1 | 8/2020 |

OTHER PUBLICATIONS

International Search Report and Written Opinion, dated Sep. 27, 2022, received in connection with corresponding International Patent Application No. PCT/US2022/031259.

Extended European Search Report, dated Mar. 10, 2025, received in connection with corresponding EP Patent Application No. 22812219.8.

International Preliminary Report on Patentability for International Application No. PCT/US2022/031259, dated Dec. 7, 2023, 6 Pages.

* cited by examiner

ANTENNA RADOME FOR REDUCED WIND LOADING

CROSS REFERENCE TO RELATED APPLICATIONS

The application is a U.S. National Stage application filed under 35 U.S.C. § 371 of PCT/US2022/031259, filed on May 27, 2022, which claims the benefit of U.S. provisional application Ser. No. 63/193,815, filed on May 27, 2021.

BACKGROUND OF THE INVENTION

Field of the Invention

The present invention relates to wireless communications, and more particularly, to cellular antennas designed to be mounted on towers where they will be subject to wind loading

Related Art

Modern cellular communications have presented many technical challenges. Among these challenges is how to pack more radiators of different frequency bands into an antenna size that is dictated by the limitations of mounting it on a cell tower. Among these limitations are the size and weight of the antenna itself. In addition, the antenna must be designed so that it can withstand extreme weather. Wind loading is a particular challenge. The performance requirements for azimuth beamwidth and elevation beam control for modern multi-band cellular antennas dictate that the antenna must have a long and flat antenna array face. This presents challenges in designing high-capacity cellular antennas that are intended to be mounted on the tops of towers, where they may be subject to intense winds.

The antenna's radome may be designed with aerodynamic features that reduce wind loading, but design options are limited by the internal structure of the antenna itself.

SUMMARY OF THE DISCLOSURE

Accordingly, the present invention is directed to an antenna radome for reduced wind loading that obviates one or more of the problems due to limitations and disadvantages of the related art.

An aspect of the present disclosure involves a cellular antenna having a radome. The radome comprises a width: a height: two forward corner regions, each having a first radius of curvature: a forward facing region disposed between the two forward corner regions, the forward facing region having a second radius of curvature; and two rear corner regions, each having a third radius of curvature, wherein the height has a dimension that is a 0.4 multiple of the width, the first radius of curvature is a 0.2 multiple of the width, the second radius of curvature is a 3.75 multiple of the width, and the third radius of curvature is a 0.065 multiple of the width.

BRIEF DESCRIPTION OF THE DRAWINGS

The accompanying figures, which are incorporated herein and form part of the specification, illustrate an antenna radome for reduced wind loading. Together with the description, the figures further serve to explain the principles of the antenna radome for reduced wind loading described herein and thereby enable a person skilled in the pertinent art to make and use the antenna radome for reduced wind loading.

It is to be understood that both the foregoing general description and the following detailed description are exemplary and explanatory only, and are not restrictive of the invention as claimed.

DESCRIPTION OF EXEMPLARY EMBODIMENTS

Accordingly, the present disclosure is directed to an antenna radome for reduced wind loading that obviates one or more of the problems due to limitations and disadvantages of the related art. Reference will now be made in detail to embodiments of the antenna radome for reduced wind loading with reference to the accompanying figures.

Figure 1:
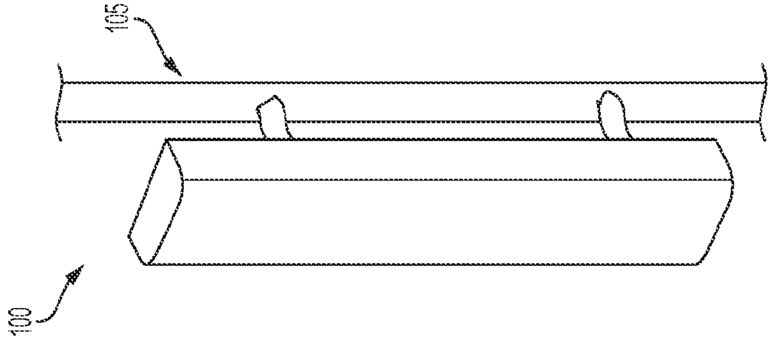
FIG. 1 illustrates a cellular antenna mounted on a tower.

FIG. 1 illustrates a cellular antenna 105 mounted on a cell tower 105. Depending on the height at which cellular antenna 105 is mounted on cell tower 105, and depending on the location of cell tower 105, antenna 100 may be subjected to considerable winds.

Figure 2:
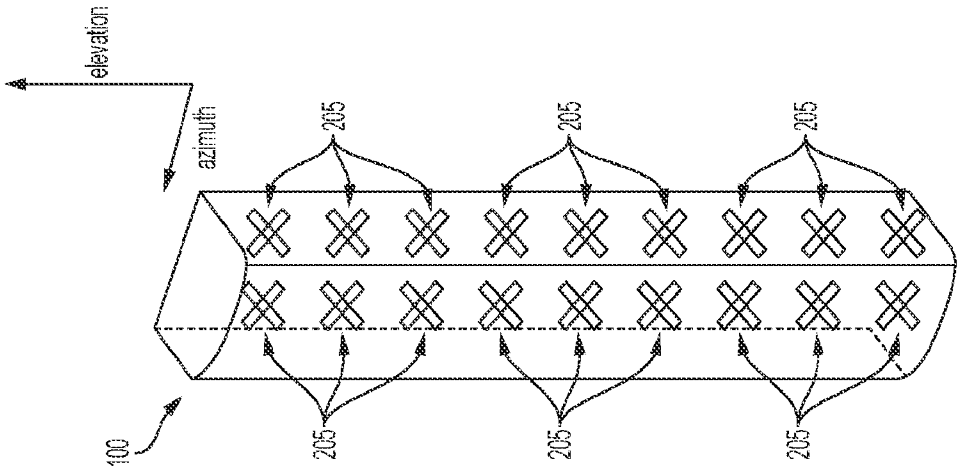
FIG. 2 is a cutaway illustration showing the inner structure of a cellular antenna, including two columns of crossed low band dipoles.

FIG. 2 is a cutaway view of antenna 100, illustrating a plurality of crossed low band dipoles 205. Low band dipoles may be arranged in one or more columns along the elevation axis. As illustrated, antenna 100 has two columns of low band dipoles 205 arranged side by side along the azimuth axis. According to general principles of beamforming, spacing the two columns of low band dipoles 205 as far apart as possible along the azimuth axis narrows the beamwidth of the radiated beam in the azimuth plane. However, increasing the distance between columns of low band dipoles 205 broadens the width of antenna 100, subjecting it to increased windloading.

Figure 3:
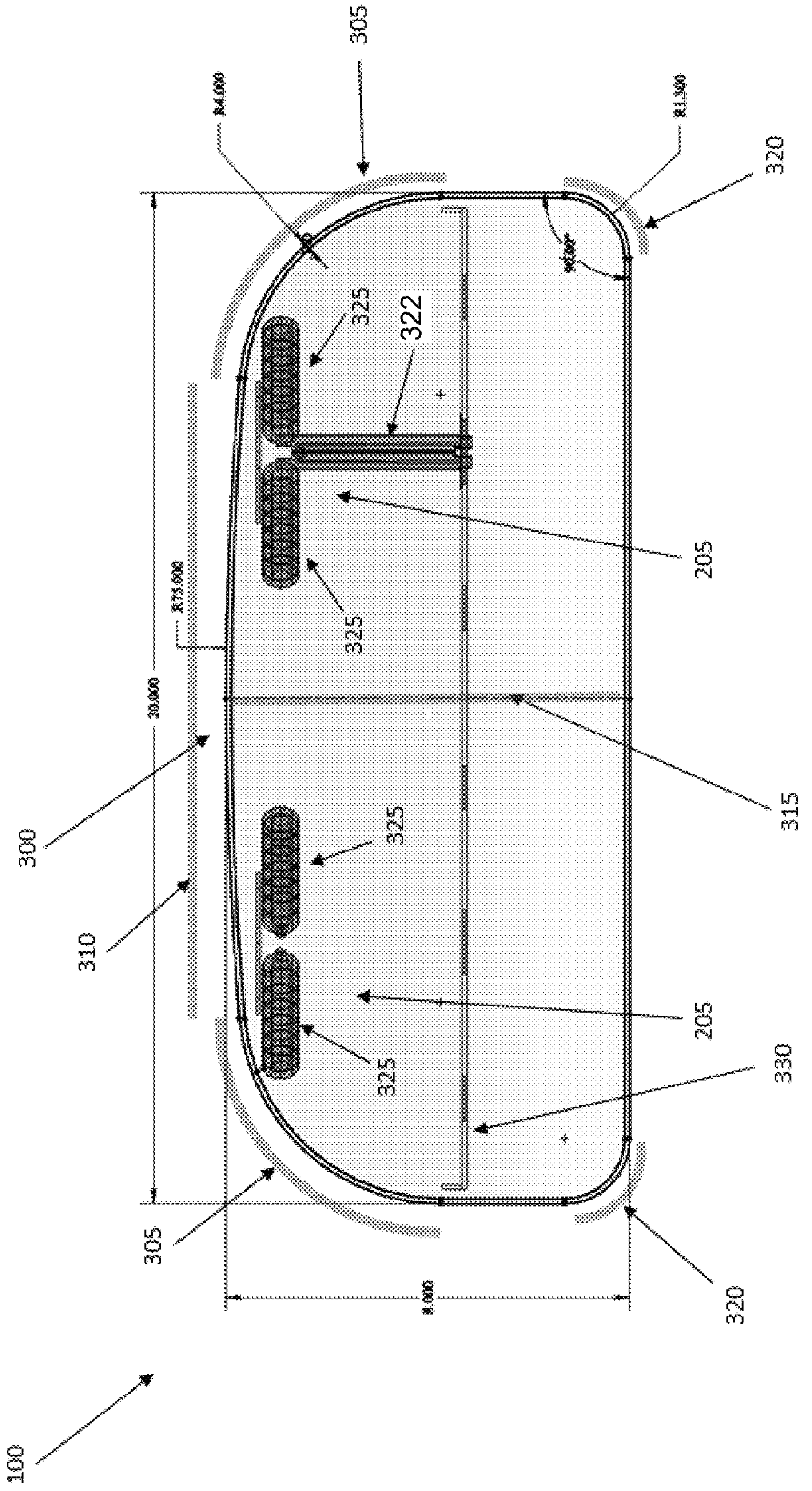
FIG. 3 is a sectional view showing the profile of the cellular antenna according to the disclosure, including exemplary internal arrangements of low band dipoles as well as exemplary radome dimensions.

FIG. 3 is a sectional view showing the profile of an antenna 100 according to the disclosure. Illustrated in the sectional view is antenna radome 300, housing two columns of low band radiators 205. Each low band radiator 205 has a plurality of low band dipole arms 325 that are mounted on a balun stem 322 (the balun stem 322 is not shown in the left low band dipole 205 for purposes of the illustration). The low band radiators are mounted on a reflector 330 disposed within radome 300.

Radome 300 has specific profile that provides for improved wind loading. As illustrated in FIG. 3, radome 300 has two forward corner regions 305, a forward-facing region 310 located between the two forward corner regions 305, and two rear corner regions 320, at the rear corners of the radome 300 having a height 315. In the illustrated exemplary embodiment, height 315 may be 8 inches: the two forward corner regions 305 may have a radius of curvature of 4 inches: the forward-facing region 310 may have a slight curvature of radius of 75 inches; and the rear corner regions 320 may have a curvature of 1.3 inches. Further, radome 300 may have a width of 20 inches.

The dimensions of the profile of radome 300 are scalable such that the same improved windloading performance may be achieved with larger or smaller antennas. For example, using antenna width W (20" in our example) as a baseline, the other dimensions may be scaled as follows:

height 315=0.4W radius of the two forward corner regions 305=0.2W radius of forward-facing region 310=3.75W radius of the two rear corner regions 320=0.065W The profile of the radome 300 described herein must accommodate an inner structure of multiple low band dipoles 205, in addition to other higher band dipoles and other components. However, the low band dipoles 205 may be the tallest (relative to reflector 330) and have the broadest dipole arms within the antenna. Accordingly, the design of the array face for the low band dipoles 205, and the design of the low band dipoles 205 themselves, present a significant challenge to the design of radome 300 that provides for best windloading performance. The radome 300 profile disclosed herein especially presents a challenge given the two forward corner regions 305, the broad curvature of which brings the outer contour of radome 300 inward toward the inner antenna structure. Accordingly, the design of low band dipole arms 325 may accommodate the disclosed curvature. An appropriate low band dipole arm 325 is shorter in length and thus provides room for the curvature of the two forward corner regions 305. One such low band dipole 205 and low band dipole arm 325 is described in co-owned co-pending U.S. patent application Ser. No. 16/758,094 LOW COST HIGH PERFORMANCE MULTIBAND CELLULAR ANTENNA WITH CLOAKED MONOLITHING METAL DIPOLE, which is incorporated by reference as if fully disclosed herein.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A cellular antenna having a radome, the radome comprising:

a width;

a height;

two forward corner regions, each having a first radius of curvature;

a forward facing region disposed between the two forward corner regions, the forward facing region having a second radius of curvature; and two rear corner regions, each having a third radius of curvature, wherein the height has a dimension that is a 0.4 multiple of the width, the first radius of curvature is a 0.2 multiple of the width, the second radius of curvature is a 3.75 multiple of the width, and the third radius of curvature is a 0.065 multiple of the width.

2. The cellular antenna of claim 1, where the width comprises 20 inches.

* * * * *